United States Patent [19]

Ishiguro

[11] Patent Number: 5,796,839
[45] Date of Patent: Aug. 18, 1998

[54] ENCRYPTION METHOD, ENCRYPTION APPARATUS, RECORDING METHOD, DECODING METHOD, DECODING APPARATUS AND RECORDING MEDIUM

[75] Inventor: Ryuji Ishiguro, Tokyo, Japan

[73] Assignee: Sony Corporation, Tokyo, Japan

[21] Appl. No.: 704,311

[22] Filed: Oct. 15, 1996

[30] Foreign Application Priority Data

Oct. 16, 1995 [JP] Japan .................................. 7-267250

[51] Int. Cl.$^6$ ........................................ H04L 9/00
[52] U.S. Cl. ...................... 380/44; 380/3; 380/44; 380/45
[58] Field of Search ...................... 380/3, 9, 21, 25, 380/43, 45

[56] References Cited

U.S. PATENT DOCUMENTS

| | | |
|---|---|---|
| 4,864,615 | 9/1989 | Bennett et al. ........................ 380/21 |
| 4,888,800 | 12/1989 | Marshall et al. ........................ 380/21 |
| 4,888,801 | 12/1989 | Foster et al. ........................ 380/21 |
| 4,933,969 | 6/1990 | Marshall et al. ........................ 380/21 |
| 4,969,188 | 11/1990 | Schobi ........................ 380/25 |
| 5,179,591 | 1/1993 | Hardy et al. ........................ 380/21 |
| 5,230,020 | 7/1993 | Hardy et al. ........................ 380/21 |
| 5,485,577 | 1/1996 | Eyer et al. ........................ 380/3 |
| 5,671,276 | 9/1997 | Eyer et al. ........................ 380/3 |

*Primary Examiner*—Salvatore Cangialosi
*Attorney, Agent, or Firm*—Frommer Lawrence & Haug LLP; William S. Frommer

[57] ABSTRACT

There are provided an encryption method, an encryption apparatus, a recording method, a decoding method, a decoding apparatus and a recording medium in which encryption keys can be managed with ease by hierarchizing encryption keys.

37 Claims, 9 Drawing Sheets

ENCRYPTION METHOD, ENCRYPTION APPARATUS, RECORDING METHOD, DECODING METHOD, DECODING APPARATUS AND RECORDING MEDIUM

BACKGROUND OF THE INVENTION

1. Field of the Invention

The present invention relates to a method of encrypting software or data, an apparatus for encrypting software or data, a method of recording encrypted software or data, a method of decoding encrypted software or data, an apparatus for decoding encrypted software or data and a recording medium in which information is recorded by a recording method. More particularly, this invention relates to a method of encrypting software or data, an apparatus for decoding encrypted software or data, a method of recording encrypted software or data, a method of decoding encrypted software or data, an apparatus for decoding encrypted software or data and a recording medium for use in preventing illegal use of software or data recorded on a recording medium such as a digital video disk or software or data supplied through a network.

2. Description of the Related Art

In order to prevent illegal use of software or data, it is customary that software or data is encrypted by use of predetermined encryption keys and encrypted software or data is recorded on a digital video disk (hereinafter simply referred to as "DVD") or supplied through a network to thereby provide encrypted software or data. The encrypted software or data recorded on the DVD or the encrypted software or data supplied through the network is decoded by the encryption keys provided separately.

The manner in which information is encrypted and decoded will be described below in brief.

Figure 1:
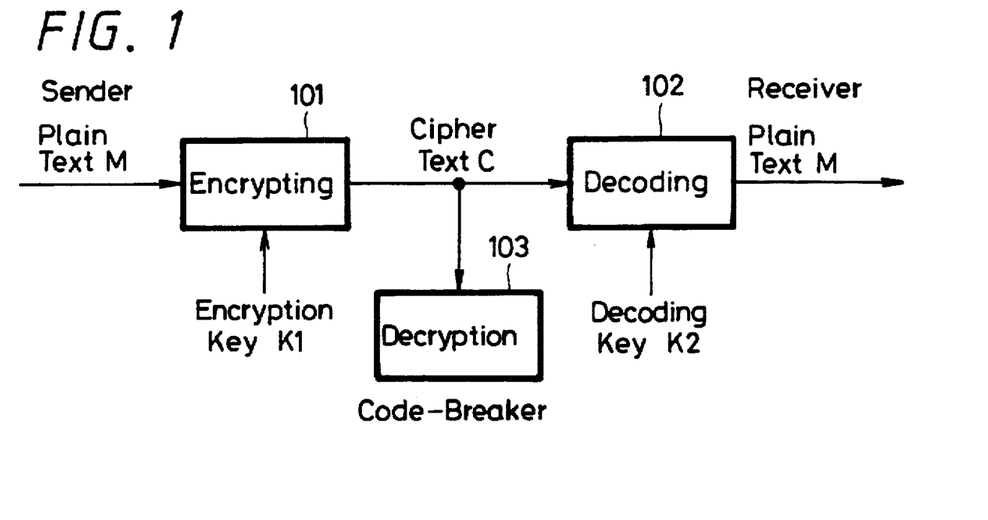
FIG. 1 is a schematic diagram showing a principle in which software or data is encrypted and encrypted software or data is decoded.

FIG. 1 of the accompanying drawings shows a principle by which information or data is encrypted and decoded.

A sender encrypts (101) plain text M (information to be transmitted) by using an encryption key K1 to provide cipher text C (data to be transmitted in actual practice). The cipher text C is transmitted to a receiver and the receiver decodes (102) the cipher text C by using a decoding key K2 to provide plain text M. In this way, plain text is transmitted from the sender to the receiver. It is frequently observed that those who have no decoding key (i.e., code-breakers) wire-tap cipher text C and decodes (103) cipher text C. The manner in which those who have a decoding key generate plain text M from cipher text C is generally referred to as "decoding" while those whose have no decoding key wire-tap cipher text C and get plain text M from cipher text C is referred to as "decryption".

However, when plain text is encrypted by the above-mentioned encryption key, once the encryption key is decrypted, such encryption key becomes ineffective for preventing illegal use. Therefore, when the encryption key is decrypted, the encryption key is updated to new one and software or data is encrypted by using such updated encryption key, thereby preventing illegal use of software or data.

However, in actual practice, even when the encryption key is updated, it is frequently observed that there exist encrypted software or data encrypted by the previous encryption key. Therefore, the previous key for decoding such software or data has to be retained. As a consequence, each time the encryption key is updated, encryption keys to be retained are increased, and the hardware and the software both face problems of managing the retained encryption keys.

When the encryption key is previously assembled from a hardware standpoint, it is sometimes very difficult to update such encryption keys into new ones.

SUMMARY OF THE INVENTION

In view of the aforesaid aspect, it is an object of the present invention to provide an encryption method, an encryption apparatus, a recording method, a decoding method, a decoding apparatus and a recording medium in which encryption keys can be managed with ease by hierarchizing encryption keys.

According to a first aspect of the present invention, there is provided a method of encrypting predetermined information by using a predetermined encryption key which comprises the steps of hierarchizing the encryption key by using a one-way function and decoding the predetermined information by using the hierarchized encryption key.

According to a second aspect of the present invention, there is provided a method of recording predetermined encrypted information on a recording medium which comprises the steps of receiving predetermined information encrypted by using an encryption key hierarchized by a one-way function and recording the encrypted predetermined information on the recording medium.

According to a third aspect of the present invention, there is provided a method of decoding encrypted predetermined information which comprises the steps of receiving encrypted predetermined information and decoding the encrypted predetermined information by using a decoding key corresponding to an encryption key hierarchized by using a one-way function.

According to a fourth aspect of the present invention, there is provided an apparatus for decoding predetermined information by using a predetermined encryption key which is comprised of means for generating encryption keys by hierarchizing encryption keys by using a one-way function and means for decoding the predetermined information by using the hierarchized encryption keys.

According to a fifth aspect of the present invention, there is provided an apparatus for decoding encrypted predetermined information which is comprised of means for receiving the encrypted predetermined information and means for decoding the encrypted predetermined information by using a decoding key corresponding to encryption keys hierarchized by using a one-way function.

In accordance with a sixth aspect of the present invention, there is provided a recording medium decodable by a decoding apparatus. The recording medium includes a recording signal decodable by the decoding apparatus and the recording signal contains predetermined information encrypted by encryption keys hierarchized by using a one-way function.

DETAILED DESCRIPTION OF THE PREFERRED EMBODIMENTS

The present invention will now be described with reference to the drawings.

Figure 2:
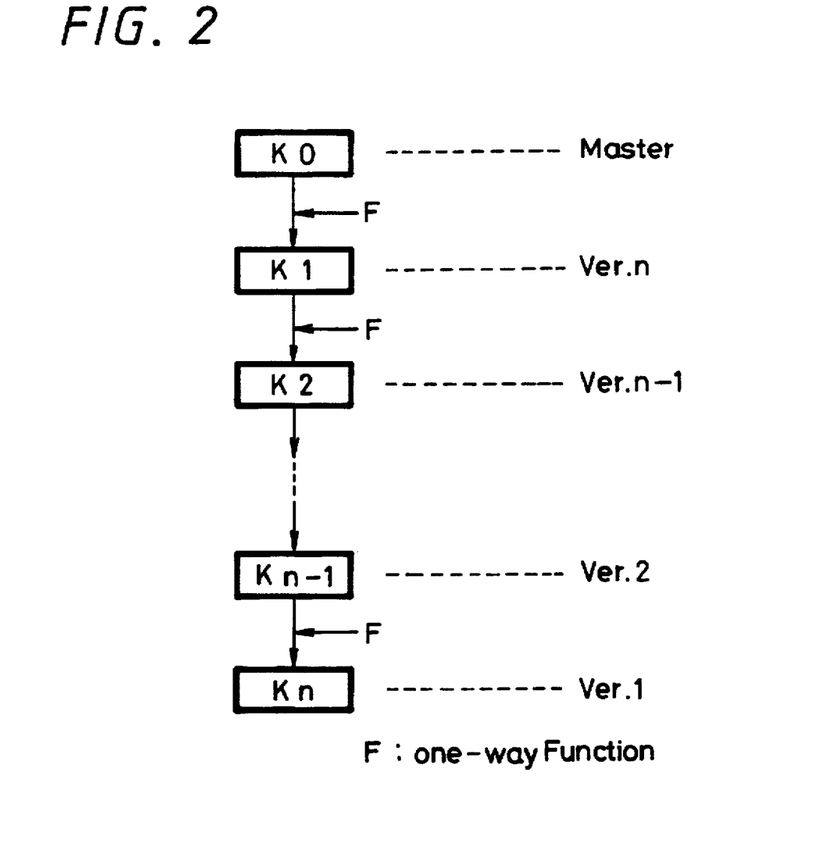
FIG. 2 is a schematic diagram showing an example of a hierarchial structure of encryption keys which can be applied to an encryption method according to the present invention.

FIG. 2 is a schematic diagram showing a manner in which encryption keys are hierarchized to which an encryption method according to the present invention is applied.

As shown in FIG. 2, an encryption key K1 of the next hierarchy (Ver.n) is formed relative to an encryption key of the first hierarchy (master key) K0 by using a so-called one-way function) F. The one-way function F is one of so-called one-way functions and carries out an irreversible calculation in which the encryption key K1 can be easily calculated from the encryption key K0 but the reverse calculation cannot be performed substantially, i.e., the encryption key K0 cannot be substantially calculated from the encryption key K1.

On the other hand, as the one-way function, there may be used encryption algorithm such as Data Encryption Standard (DES, National Bureau of Standards FIPS Publication 46, 1977), Fast Encryption Algorithm (FEAL, S. Miyaguchi. The FEAL cipher family. Lecture Notes in Computer Science. 537 (1001), pp. 627 to 638. (Advances in Cryptology - CRYPTO '90) or a message digest algorithm such as Message Digest algorithm (MD4, R. L. Rivest. 537 (1001), pp. 303 to 311. (Advances in Cryptology - CRYPTO '90) or Secure Hash Standard (SHS, Secure Hash Standard, National Bureau of Standards FIPS Publication 180, 1993). DES and FEAL were described in detail in "Cipher and Information Security by Tsujii and Kasahara, July 1993".

Subsequently, the one-way function will be described in detail with reference to examples.

In the case of DES, the one-way function and the DES have therebetween established a relationship expressed by the following equation (1):

$$F(k)=DES(IV, k) \quad (1)$$

where IV is the Initial Vector arbitrary and k is the key.

Moreover, as algorithm used in one-way function, there may be used the following ones:

Block cipher (product cipher)-based algorithm; and
Arithmetic algorithm

The block cipher (product cipher)-based algorithm can obtain cipher text by encrypting plain text by using a key as expressed by the following equation (2):

$$C=Enc\ (P, k) \quad (2)$$

where C is the cipher text, p is the plain text, and k is the key.

Specifically, a bit string of fixed length is obtained by effecting irreversible transform on the key by a certain kind of hash function at every block.

Then, the plain text is processed by permutation box or substitution box for substituting data or the like several rounds. In each round, the plain text is processed by a certain calculation with the bit string obtained from the key, e.g., logical calculation of exclusive-OR.

The arithmetic algorithm is used in a problem of discrete logarithm as expressed by the following equation (3):

$$F(k)<\!\!=\!\!>a k\ mod\ p \quad (3)$$

where a is the predetermined constant, k is the key and p is the prime number.

In the above equation (3), symbol "$<\!\!=\!\!>$" means "definition".

Specifically, function F(k) is defined as "remainder which results from dividing product multiplied with k by p". In this case, the function F(k) can be obtained from the key (k) with ease but it is very difficult to obtain the key (k) from the function F(k).

As described above, after the encryption key K1 was obtained from the master key by using the one-way function (F), encryption keys K2, K3, . . . , Kn-1, Kn are sequentially calculated by using the one-way function (F) as expressed by the following equation (4), thereby resulting in hierarchized encryption keys (Ver.n through Ver.1) being formed:

$$ki=F(Ki-1) \quad (4)$$

where i=1, 2, 3, . . . . n)

The numerical value n is the sufficient number of hierarchies (number of generations).

Accordingly, although new encryption keys can be calculated with ease by using the one-way function (F) as described above, the reverse calculation cannot be carried out substantially, i.e., the original key cannot be calculated substantially from the encryption keys by using the one-way function (F).

A method of encrypting information such as software or data and providing encrypted information to the user according to the present invention will be described below. When information such as software or data is encrypted and provided to the user, as shown in FIG. 2, information is initially encrypted by using the encryption key Kn (Ver.1) and the encrypted key Kn is distributed to the user in the formed of either being attached to the encrypted information or being supplied separately. The user can decode the encrypted information by using the encryption key Kn.

When this encryption key Kn is decrypted, information such as software or data is encrypted by the encryption key Kn-1 of higher hierarchy (Ver.2) and the encryption key Kn-1 is distributed to the user. Similarly, each time an encryption key is decrypted, information is encrypted by using an encryption key of higher hierarchy and the encrypted key is distributed to the user.

The encryption key Kn of lowest hierarchy (Ver.1) initially distributed is calculated from the encryption key Kn-1 of the next hierarchy by using the function (F). Specifically, the encryption key Kn can easily be calculated by using the function (F) and information encrypted by the encryption key Kn can be decoded by using the encryption key Kn calculated from the encryption key Kn-1. Accordingly, since the encryption key is calculated from the encryption key of the next hierarchy by using the function (F), the next encryption key can be calculated by using the function (F) in any generation. Therefore, if the user retains the latest encryption key which is not decrypted, then the user can decode not only information encrypted by the latest encryption key but also information encrypted by a previous encryption key. Moreover, all encryption keys are keys that are sequentially generated from the master key by using the one-way function (F). Accordingly, if the user retains the master key instead of the latest encryption key which is not decrypted, then the user can decode information encrypted by all encryption keys. Thus, the encryption keys can be managed with ease.

Figure 3:
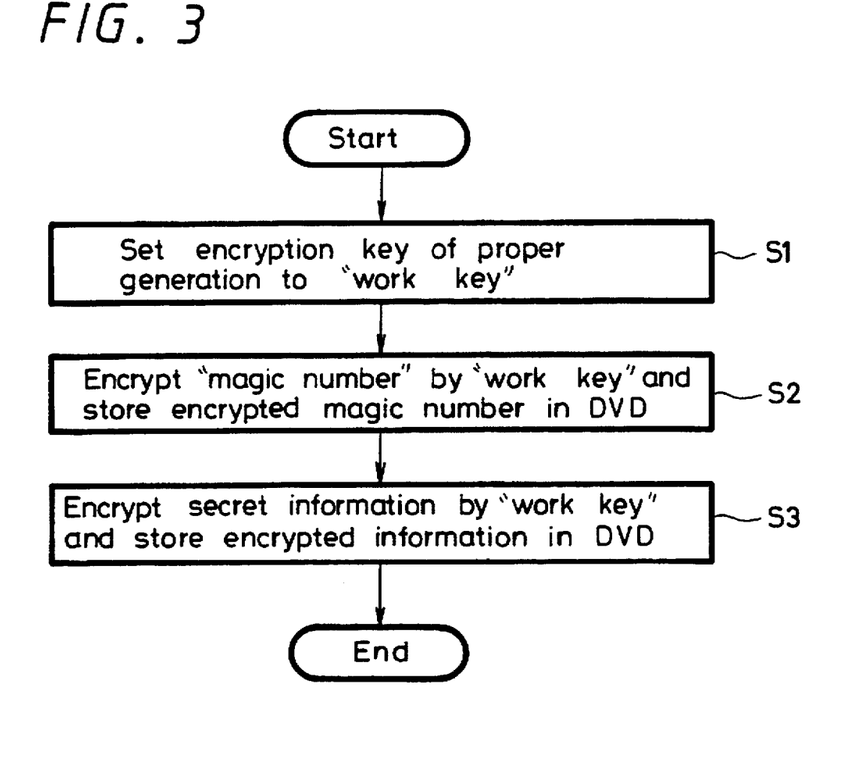
FIG. 3 is a flowchart illustrative of a manner in which a DVD on which encrypted information is recorded is made.

FIG. 3 is a flowchart used to explain a manner in which information (plain text) such as moving image, sounds, data or software is encrypted and recorded on a recording medium such as a disk (e.g., DVD and hereinafter referred to as "DVD"), for example, by using the encryption keys shown in FIG. 2.

Referring to FIG. 3, following the start of operation, an encryption key of a proper generation (hierarchy) is selected from hierarchized encryption keys shown in FIG. 2 at a step S1 and the selected encryption key is set to a work key. Then, control goes to a step S2, wherein a string of predetermined numerals and characters is set to a magic number, the magic number is encrypted by the work key obtained at the step S1 and the encrypted magic number obtained by the encryption is recorded on a predetermined portion of a DVD 1 as shown in FIG. 4, for example.

Figure 4:
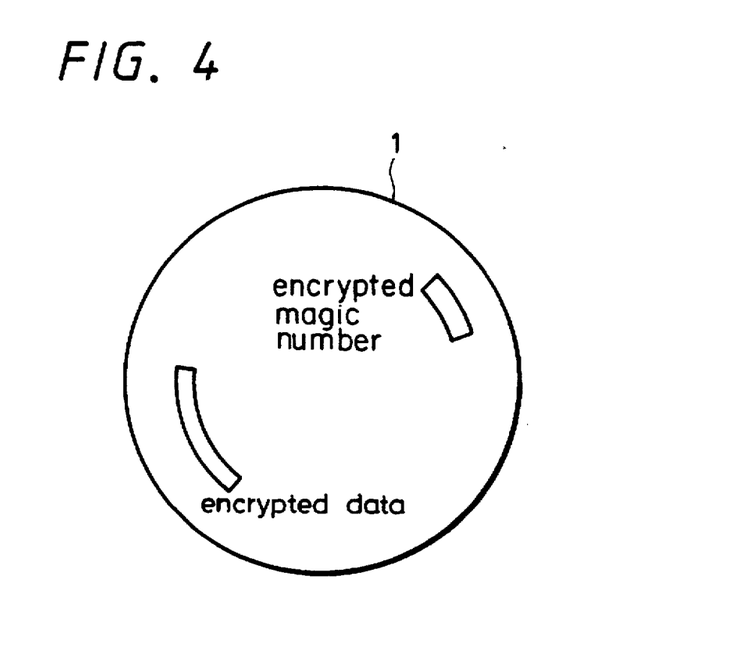
FIG. 4 is a schematic diagram showing a DVD on which there are recorded encrypted magic key and encrypted information.

Thereafter, control goes to a step S4, whereat encrypted data, i.e., plain text data is encrypted by using the work key and encrypted data (cipher text) is recorded on a predetermined portion of the DVD 1 as shown in FIG. 4.

An encryption apparatus corresponding to the above-mentioned encryption method will be described with reference to FIG. 5.

Figure 5:
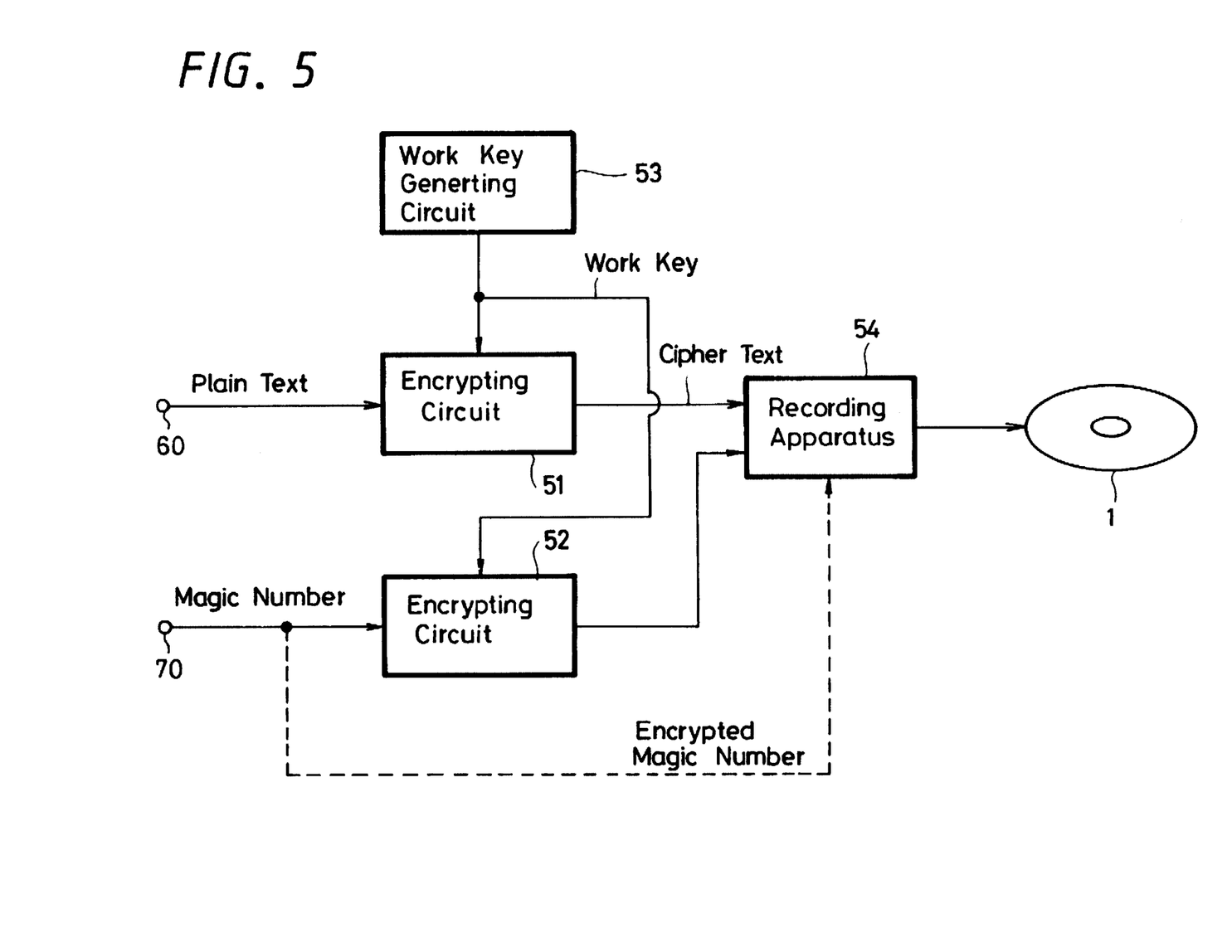
FIG. 5 is a block diagram showing an example of an encryption apparatus according to the present invention.

As shown in FIG. 5, plain text data and magic number are supplied to terminals 60 and 70, respectively. The plain text data and the magic number from the terminals 60, 70 are respectively supplied to corresponding encryption circuits 51, 52. The magic number is the string of predetermined numerals and characters as described above. A work key generating circuit 53 selects an encryption key of a proper generation (hierarchy) from the hierarchized encryption keys shown in FIG. 2 and supplies the selected encryption key to the encryption circuits 51, 52 as a work key. The encryption key 52 encrypts the supplied magic number by using the work key supplied thereto from the work key generating circuit 53. Then, encrypted magic number thus obtained by encryption is supplied to a recording apparatus 54. The encryption circuit 51 encrypts the supplied plain text data by using the work key and supplies the encrypted information to the recording apparatus 54. The recording apparatus 54 records the encrypted information and the encrypted magic information on the predetermined positions of the DVD 1 as shown in FIG. 4.

If the recording apparatus 54 is a formatter for generating a master disk, then a stamper is formed from the master disk and a large number of disks are produced by using such stamper.

Figure 6:
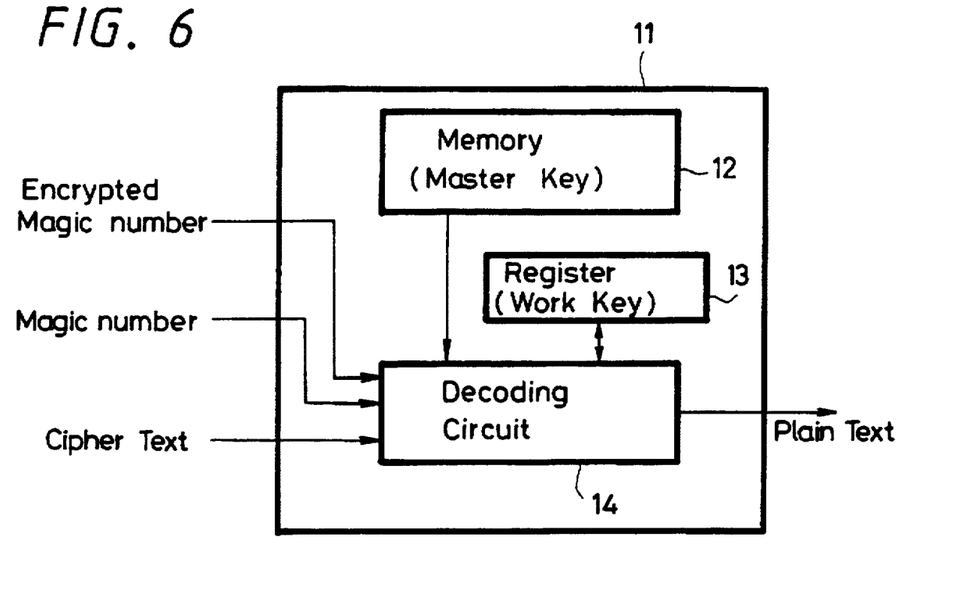
FIG. 6 is a block diagram showing an example of an IC chip 11 for decoding information recorded on the DVD shown in FIG. 4.

FIG. 6 is a block diagram showing an IC chip for decoding encrypted information recorded on the DVD 1 in a disk player (DVD player and hereinafter referred to as "DVD player") for playing back the thus made DVD 1. Magic number, encrypted magic number and encrypted information (cipher text) are inputted to an IC chip 11. The encrypted magic number is supplied from the DVD 1, the magic number is stored in a memory (not shown) of the DVD player itself and supplied from such memory. This magic number is a string of predetermined numerals and characters. This magic number is the same as that used in the encryption side.

A memory 12 stores the encrypted key K0 shown in FIG. 2, i.e., master key. A register 13 stores an encryption key of a predetermined generation obtained by using the above function (F) relative to the master key, i.e., work key as will be described later on. A decoding circuit 14 generates a work key based on the inputted magic number, the encrypted magic number and the master key read out from the memory 12 and supplies the thus formed work key to the register 13 as will be described later on. The decoding circuit 14 decodes the inputted and encrypted information (cipher text) by using the work key and outputs the decoded data as plain text data (plain text).

The manner in which the encrypted data recorded in the DVD 1 within the IC chip 11 is decoded will be described with reference to a flowchart of FIG. 7.

Figure 7:
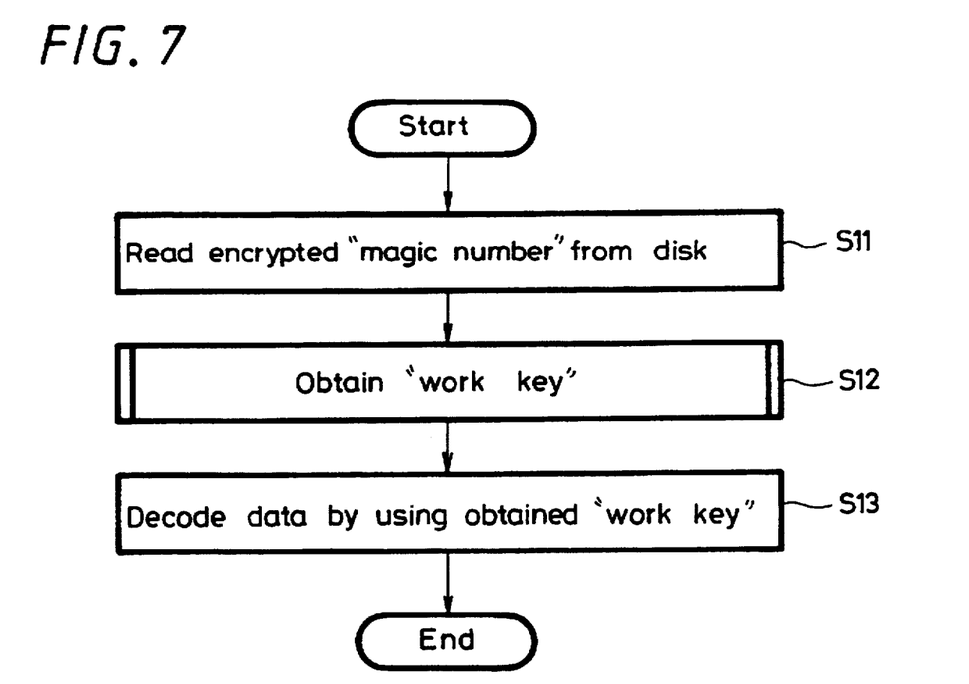
FIG. 7 is a flowchart to which reference will be made in explaining operation of the IC chip 11 shown in FIG. 6.

Referring to FIG. 7, following the start of operation, in a step S11, the encrypted magic number is read out from the predetermined position of the DVD 1. Then, control goes to a step S12, whereat a work key is obtained from the encrypted magic number read out at the step S1 and the magic number read out from the memory (not shown) of the DVD player itself as will be described later on with reference to a flowchart of FIG. 8.

Figure 8:
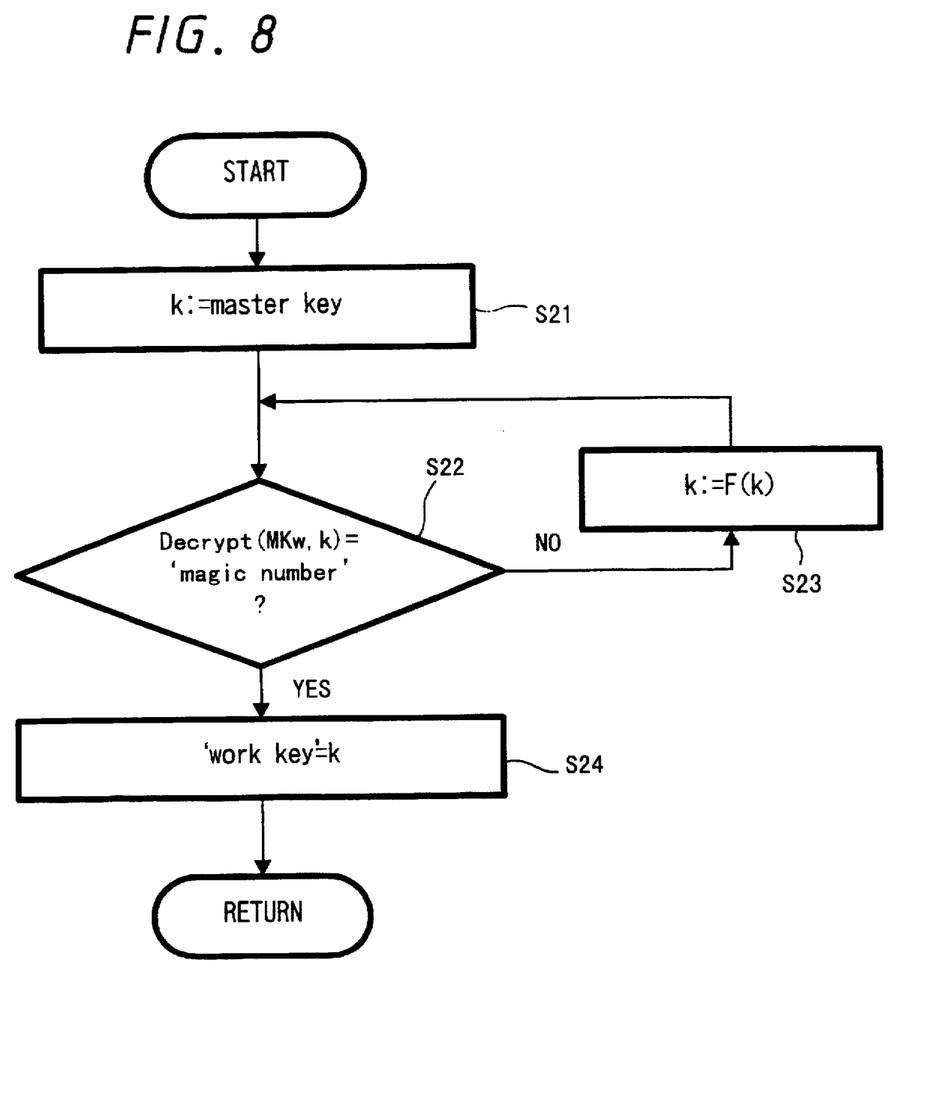
FIG. 8 is a flowchart to which reference will be made in explaining the detail of a step S12 shown in FIG. 7.

FIG. 8 is a flowchart used to explain the processing at the step S12 in FIG. 7 more in detail.

Referring to FIG. 8, following the start of operation, initially, at a step S21, a master key is read out from the memory 12 of the IC chip 11 and set to a selection key (k). Then, this selection key (k) is supplied to the decoding circuit 14. The selection key (k) expresses an encryption key that is selected at present.

As shown in FIG. 8, control goes to the next decision step S22, whereat the magic number and the encrypted magic number are supplied to the decoding circuit 14 and thereby the encrypted magic number is decoded by using the selection key (k). Then, it is determined at the decision step S22 whether or not the result which results from decoding the encrypted magic number by the selection key (k) agrees with the magic number. If the decoded result and the magic number which is not encrypted do not agree with each other as represented by a NO at the decision step S22, then it is determined that this selection key is not the encryption key which encrypts the encrypted magic number on the encryption side. Then, control goes to a step S23, whereat an encryption key of the next generation is calculated from the selection key (k) by using the one-way function (F) as expressed by the following equation (5) and set to a new selection key (k):

$$k = F(k) \tag{5}$$

Then, control goes back to the step S22 and the similar processing is executed repeatedly.

If on the other hand the result which results from decoding the encrypted magic number by the selection key (k) and the magic number which is not encrypted agree with each other as represented by a YES at the decision step S22, then it is determined that the selection key (k) is the encryption key which encrypts the encrypted magic number. Then, control goes to a step S24, wherein the decoding circuit 14 selects this selection key (k) as a work key and supplies this selection key (k) to the register 13, in which it is registered. Then, processing in the flowchart of FIG. 8 is ended and control goes back to the processing of the flowchart of FIG. 7.

Thereafter, control goes to a step S13 in the flowchart of FIG. 7, whereat the decoding circuit 14 reads out the work key obtained at the step S12 (steps S21 to S24 shown in FIG. 8) from the register 13, decodes the encrypted information (cipher text) inputted to the decoding circuit 14 by using the work key and outputs the decoded information as plain text data (plain text).

As described above, since the IC chip 11 obtains the work key corresponding to the encrypted information from the master key and decodes the inputted encrypted information by using this work key, if the user retains only this master key, then the user can decode information encrypted by an encryption key of any hierarchy.

Figure 9:
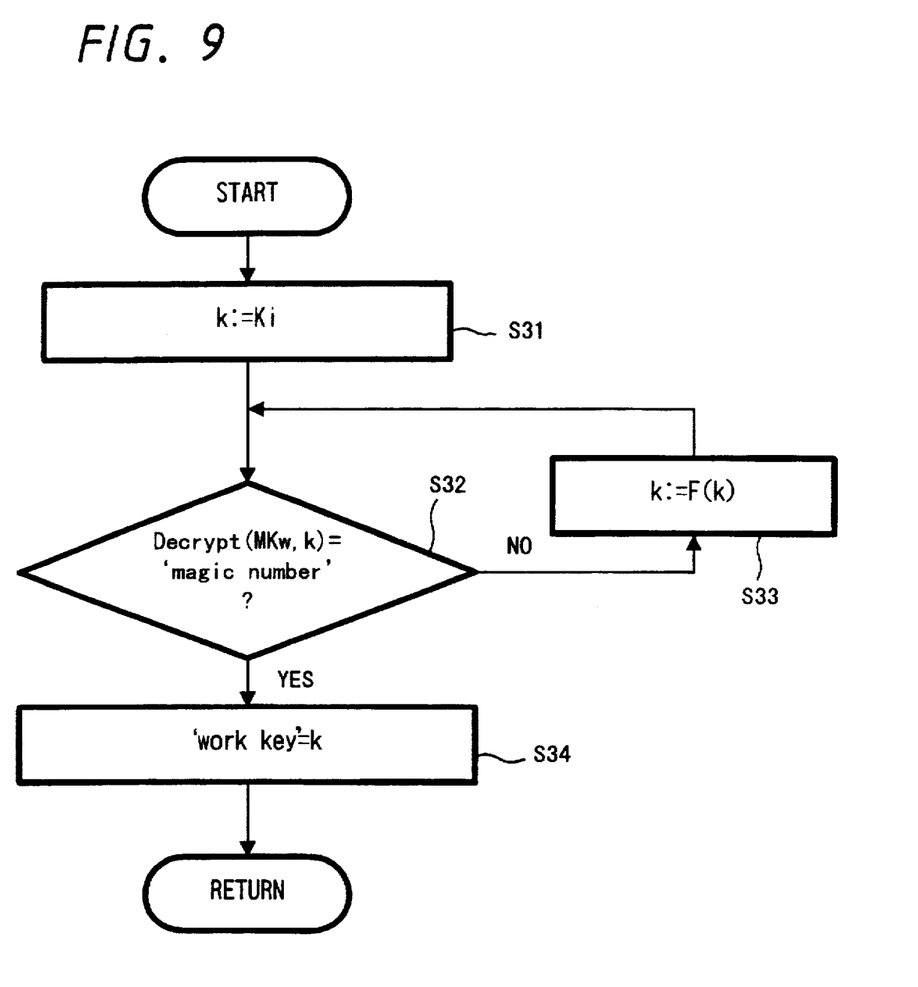
FIG. 9 is a flowchart to which reference will be made in explaining the detail of the step S12 shown in FIG. 7.

When the above-mentioned processing is carried by a software of computer, the processing at the step S12 of FIG. 7 is replaced with a flowchart shown in FIG. 9. FIG. 9 is a flowchart showing a manner in which encrypted information is decoded in a computer which realizes the function shown in FIG. 6 by software. In this case, the computer incorporates therein a decoding board corresponding to FIG. 6 and software is memorized in a memory of such decoding board. Moreover, in this case, a master key that is previously stored in the memory is not used but a latest encryption key (or may be a master key) to be distributed is used.

As will be described later on with reference to FIG. 10, for example, the user inputs an encryption key (Ki) (where i represents any one of n, n–1, . . . , 1) of a predetermined hierarchy distributed in the form of being printed on the DVD through a keyboard to a computer. Such encryption key is memorized in a predetermined memory disposed within the computer. Alternatively, the computer receives the latest encryption key distributed through a telephone network line or a network and stores a predetermined memory (e.g., RAM (random-access memory)).

Referring to FIG. 9, following the start of operation, at a first step S31, inputted encryption key (Ki) of a predetermined hierarchy is read out from the memory and set to a selection key (k). The selection key (k) expresses an encryption key selected at present similarly as described above.

Then, control goes to a decision step S32, whereat a magic number read out from the memory and an encrypted magic number read out from the DVD are supplied and the encrypted magic number is decoded by the selection key (k). In the decision step S32, it is determined whether or not a result which results from decoding the encrypted magic number by the selection key (k) and the magic number agree with each other. If the decoded result and the magic number which is not encrypted do not agree with each other as represented by a NO at the decision step S32, then it is determined that the selection key (k) is not the encryption key which encrypts the encrypted magic number. Therefore, control goes to a step S33, whereat an encryption key of the next generation is calculated from the selection key (k) by using a one-way function (F) and the thus calculated encryption key of the next generation is set to a new selection key (k).

Then, control goes back to the step S32 and the similar processing is repeatedly executed.

If on the other hand the result which results from decoding the encrypted magic number by the selection key and the magic number agree with each other as represented by a YES at the decision step S32, then it is determined that the selection key (k) is the encryption key which encrypts the encrypted magic number. Therefore, control goes to the next step S34, whereat this selection key (k) is set to the work key and this work key is stored in a predetermined memory (e.g., register). Then, the processing in the flowchart of FIG. 9 is ended and control goes back to the flowchart of FIG. 7.

Thereafter, control goes to the step S13 of the flowchart shown in FIG. 7, whereat encrypted information is decoded by using the work key obtained at the step S12 (steps S31 to S34 shown in FIG. 9) and outputted as plain text data (plain text).

As described above, when information encrypted by the software of the computer is decoded, it is possible to decode information encrypted by at least the encryption key (Ki) or encryption keys ($K_{i-1}$ through K1) of hierarchies lower than the encryption key (Ki) based on the encryption key of arbitrary hierarchy distributed.

As described above, according to the embodiment of the present invention, since information encrypted by the previous encryption keys can be decoded based on the latest encryption key (may be master key or encryption key of arbitrary hierarchy), it is sufficient that only the latest encryption key is memorized. Therefore, unlike the prior art, in addition to the previous encryption keys, new encryption keys need not be memorized and managed each time an encryption key is decrypted and an encryption key is varied. Thus, encryption keys can be managed with ease.

Further, in the embodiment shown in FIG. 6, since the encryption key (master key) is stored in the memory 12 disposed within the IC chip 11, an encryption key of a predetermined hierarchy is calculated within the IC chip 11 and encrypted information is decoded, the encryption key can be prevented from being leaked to the outside and decryption of the encryption key can be made difficult. Further in the above-mentioned embodiment, since the processing for calculating the work key and the processing for decoding the encrypted information can be carried out by the same decoding circuit 14, the circuit can be saved.

The manner in which encryption keys are distributed will be described with reference to FIGS. 10 to 12.

Figure 10:
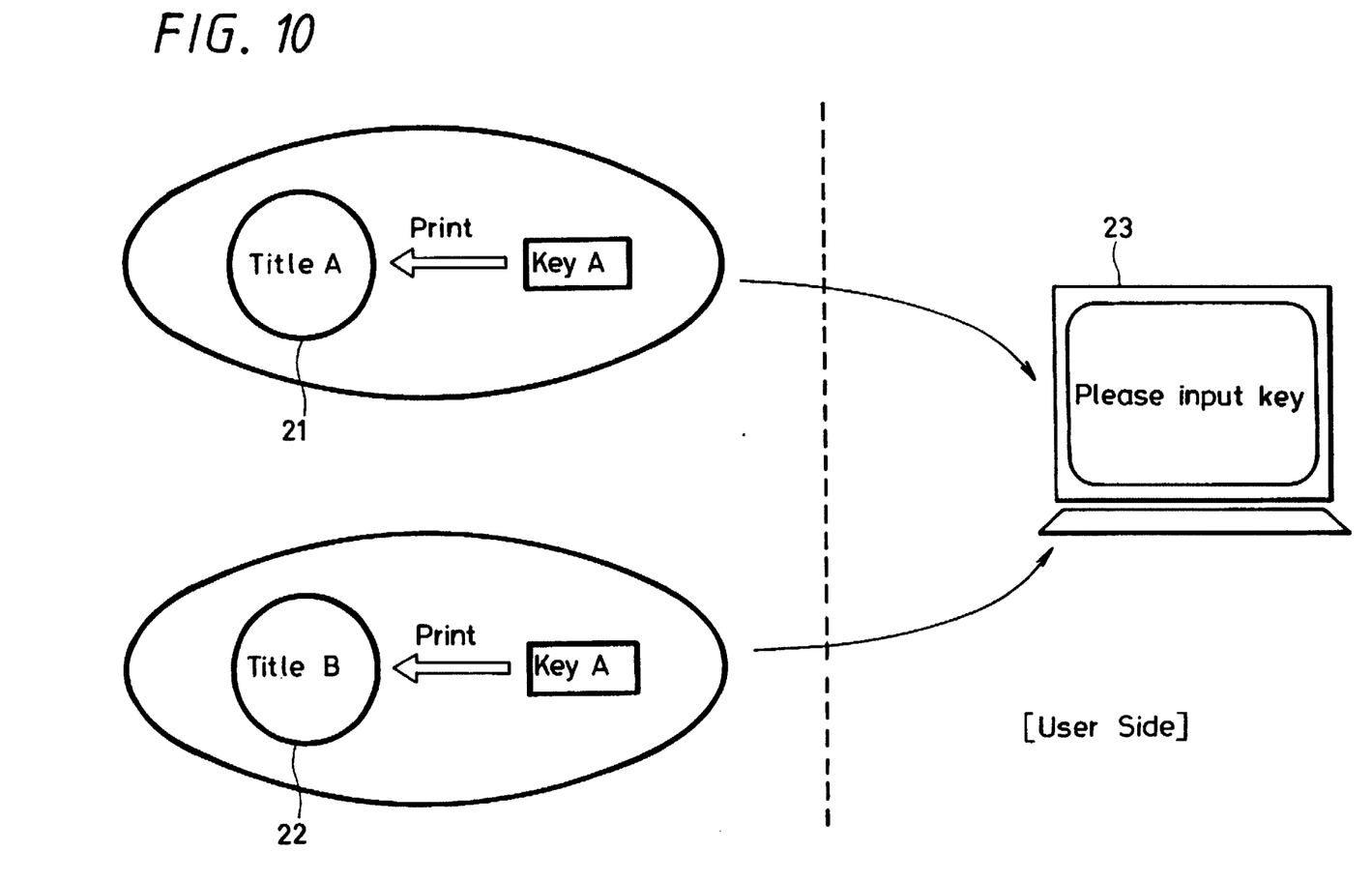
FIG. 10 is a schematic diagram used to explain a manner in which encryption keys are printed on DVDs and distributed.

FIG. 10 illustrates the manner in which encryption keys are printed on a case of DVD or DVD itself and distributed.

As shown in FIG. 10, alphanumeric character, bar code, hologram or the like corresponding to an encryption key of a predetermined hierarchy is printed on a case of a DVD 21 with a title A recorded thereon or the surface of the DVD 21 itself. Similarly, alphanumeric character, bar code, hologram or the like corresponding to an encryption key B of a predetermined hierarchy is printed on a case of a DVD 22 with a title B recorded thereon or the surface of the DVD 22 itself. In this manner, the encryption key A can be distributed to the user together with the DVD 21 and the encryption key B can be distributed to the user together with the DVD 22. Alternatively, data indicative of the encryption key A may be recorded on a recording medium such as an IC card and distributed to the user together with the DVD 21 or data indicative of the encryption key B may be recorded on a recording medium such as an IC card and distributed to the user together with the DVD 22.

When the user plays back the DVD 21, the user enters the encryption key A printed on the DVD 21 into a computer 23 by using an input apparatus such as a keyboard. As described above with reference to the flowchart shown in FIG. 9, the computer 23 executes the function that the IC chip 11 shown in FIG. 6 executes, i.e., the function for decoding encrypted information in accordance with a predetermined application program.

Then, when the DVD 21 is set on a DVD reader (not shown), the computer 23 reads out the encrypted information from the DVD 21 through the DVD reader and decodes the encrypted information read out from the DVD 21 based on the previously-entered encryption key A. Of course, encrypted information recorded on the DVD 22 can be decoded in the same way as in the DVD 21.

Accordingly, this case is suitable for distributing different encryption keys at every title of DVD. For example, encryption keys computed from different master keys by one-way function may be assigned to every title of DVD.

Furthermore, even when the encryption key A corresponding to the title A is decrypted, the encryption key A corresponding to the title A is updated to an encryption key A2 of higher hierarchy and continuation information of the title A is encrypted by the encryption key A2, the encryption key A that is not yet updated can be easily obtained from the encryption key A2 by a predetermined computation similarly as described above with reference to the flowchart of FIG. 9. Therefore, the user can decode the title A encrypted by the previous encryption key by using only the latest encryption key (in this case, the encryption key A2).

Figure 11:
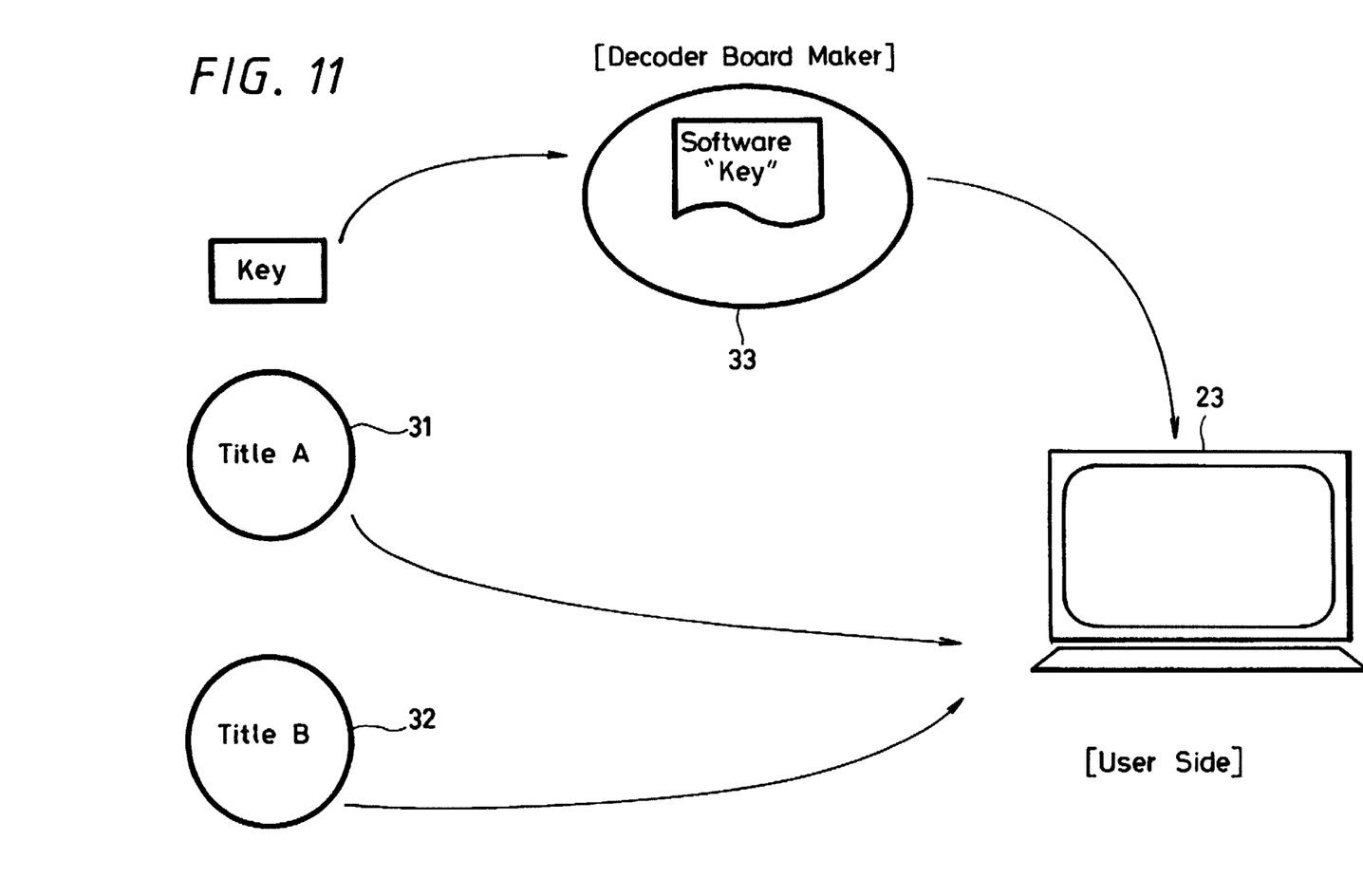
FIG. 11 is a schematic diagram used to explain a manner which an encryption key is inserted into decoding software and distributed.

FIG. 11 illustrates the manner in which a code indicative of encryption key is inserted into software for decoding an encryption key and distributed to the user.

As shown in FIG. 11, a code indicative of encryption key is inserted into decoding software provided on a decoding board 33 for decoding encryption information. Then, this decoding board 33 is loaded onto the computer 23. Thus, the computer 23 can decode encrypted information recorded on DVDs 31, 32 through the decoding board 33 and output moving picture, still picture and sounds corresponding to decoded information.

This example is suitable for distributing the same encryption key to the user.

In the case of this example, the computer 23 may be connected to a telephone network line or a network, whereby updated encryption key may be distributed to the computer 23 through the telephone network line or the network. The computer 23 memorizes the latest encryption key distributed thereto through the telephone network line or the network in the software for decoding the decoding board 33.

Then, the computer 23 can decode information recorded on the DVDs 31, 32 by using this encryption key similarly as described above with reference to FIGS. 7 and 9.

Further, information encrypted by the encryption key can be supplied to the computer 23 through the telephone network line or the network. In this case, the computer 23 decodes this information by using the encryption key previously distributed through the telephone network line or the network.

As described above with reference to FIG. 2, encryption keys of all hierarchies can be formed from the hierarchized first encryption key (K0) by using the one-way function (F) and this encryption key K0 can be used as the master key. Therefore, if the encryption key serving as the master key is inserted into a hardware such as an integrated circuit (IC), then encryption keys of all hierarchies can be formed from this encryption key K0 and even information encrypted by any one of encryption keys (K1 through Kn) can be decoded. Since it is very difficult for the users to decrypt data inserted into the hardware such as the integrated circuit, illegal use of the encryption key can be suppressed.

Figure 12:
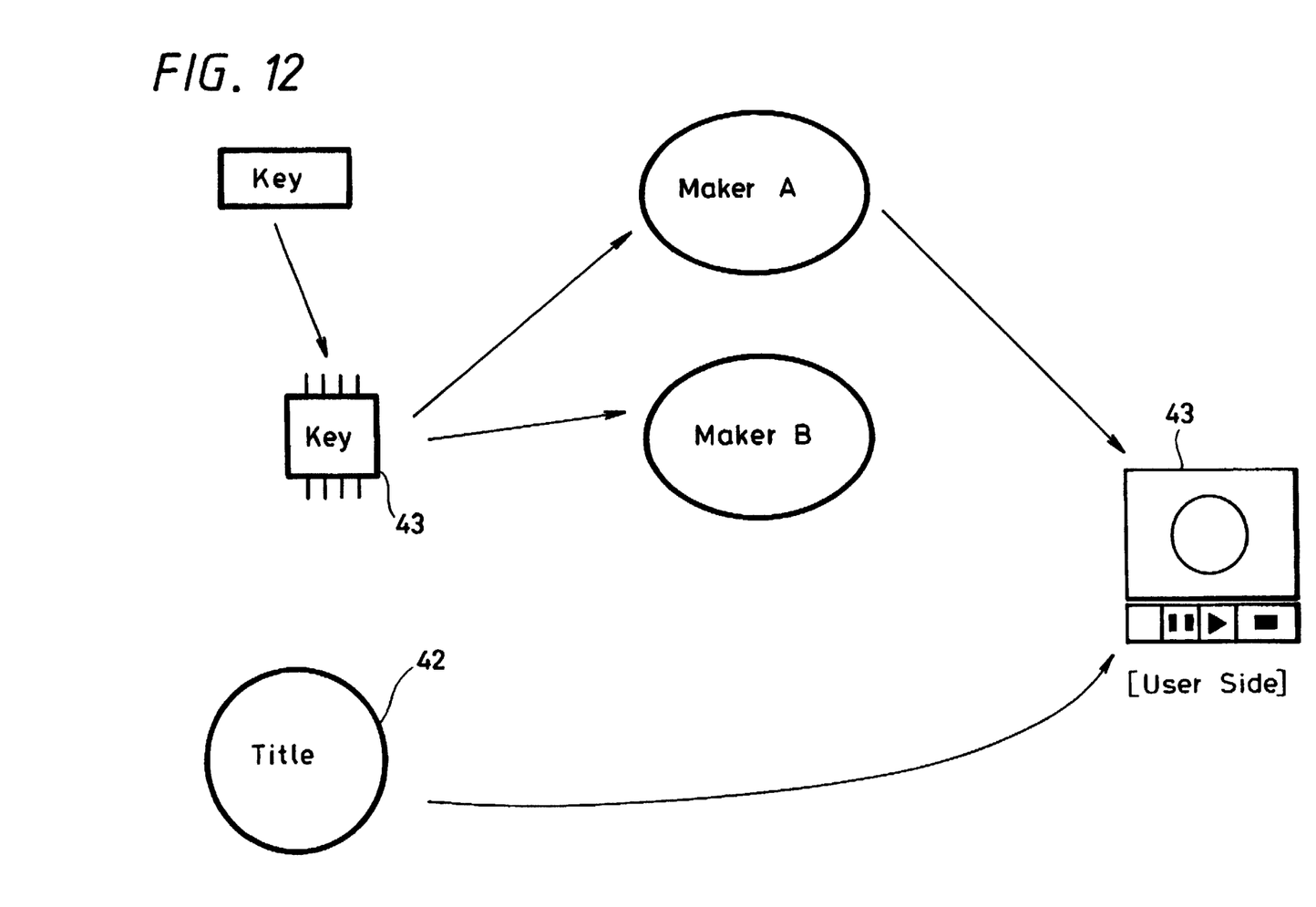
FIG. 12 is a schematic diagram used to explain a manner in which an encryption key is incorporated into an integrated circuit and distributed.

FIG. 12 illustrates the manner in which an encryption key is inserted into an integrated circuit and distributed. As shown in FIG. 12, a maker having a legal obligation to keep secret manufactures an integrated circuit 41 in which a master key is stored. The IC chip 11 can be applied to the integrated circuit 41. In the case of this example, the integrated circuit 41 is supplied to a maker A. Then, after the integrated circuit 41 was assembled into a DVD player 43, the integrated circuit 41 is distributed to the user.

On the other hand, magic number encrypted by using an encryption key of a predetermined hierarchy memorized in the integrated circuit 41 and predetermined encryption information encrypted by this encryption key are recorded on a DVD 42.

When the user sets the DVD 42 on the DVD player 43, a master key is read out from the integrated circuit 41 and a work key is obtained in the same manner as that described with reference to the flowcharts shown in FIGS. 7 and 8, whereby encrypted information recorded on the DVD 42 is decoded and corresponding moving picture, still picture and sounds can be outputted.

When the master key is memorized in the integrated circuit as described above, the DVD player 43 is able to decode and output encrypted information recorded on the DVD 42 regardless of hierarchy of encryption key which encrypts the information recorded on the DVD 42.

The integrated circuit 41 may memorize therein not the master key but an encryption key of a predetermined hierarchy of encryption keys computed from the master key by using a one-way function. In that case, when information encrypted by that encryption key or an encryption key of hierarchy lower than that of the above encryption key is recorded on the DVD 42, the DVD player 43 can decode the information recorded on the DVD 42.

The method in which a predetermined encryption key is memorized in a predetermined integrated circuit and assembled into the DVD player 43 is suitable for the case wherein the same encryption key is distributed regardless of the title of DVD.

As described above, since the encryption key is hierarchized by using the one-way function, information is decoded by using an encryption key of arbitrary hierarchy of the hierarchized encryption keys and this encryption key is distributed to the user, the user can decode information encrypted by the previous encryption key only by retaining the latest encryption key. Thus, encryption keys can be managed with ease.

The embodiment shown in FIG. 12, for example, can be more effectively applied to the case wherein encryption keys cannot be interchanged easily through a network. Specifically, when information such as software or moving picture is encrypted by an encryption key of a predetermined hierarchy and recorded on the DVD 42, the integrated circuit 41 memorizes the master key therein so that an encryption key of an arbitrary hierarchy can be formed from this master key by using the one-way function (F). Thus, the information encrypted by the encryption key of the predetermined hierarchy recorded on the DVD 42 can be decoded.

Therefore, even if the encryption key is updated and information encrypted by an encryption key of a new hierarchy is recorded on the DVD 42 because the previous encryption key is decrypted, the user can decode and reproduce such information satisfactorily in a usual manner.

Since DVD players which do not have the integrated circuit 41 with encryption keys stored therein are unable to correctly reproduce the DVD 42 in which information encrypted by this encryption key is recorded, use of information can be limited properly. Further, since computers which do not have the decoding board in which encryption keys are memorized are unable to correctly reproduce a recording medium in which information encrypted by the encryption key, use of information can be limited properly.

Furthermore, encryption keys are distributed in the form of alphanumeric characters, bar code or hologram printed on the recording medium such as DVD or the case of DVD, data corresponding to the encryption key is memorized in the IC card, data corresponding to an encryption key (e.g., master key) is memorized in the integrated circuit which is difficult to be used illegally, data corresponding to the encryption key is inserted into the decoding software or data corresponding to the encryption key is distributed through the telephone network line or the network, whereby the encryption key can be distributed extremely easily.

While the DVD is used as the recording medium as described above, the recording medium is not limited to the DVD and other recording media such as CD-ROM (compact disc-read-only memory), MD (minidisc, registered trademark), optical disk, magnetooptical disk or floppy disk can be used.

The present invention can be applied to the case that information is provided through a network such as Internet.

While the DVD player itself stores the magic number in a predetermined memory as described above, the present invention is not limited thereto and the magic number may be recorded on a predetermined portion of DVD, for example, whereafter it may be read out and inputted to the decoding circuit 14 (FIG. 6). In that case, as shown in FIG. 5, the magic number is supplied to the recording apparatus 54 and thereby recorded on the disk 1.

Although the computer decodes encrypted information by using software as described above, the following variant is also possible. That is, software is not used and the IC chip according to the present invention may be incorporated within the computer and the IC chip may decode encrypted information. In this case, since computers which do not have the integrated circuit 41 in which encryption keys are memorized are unable to correctly decode encrypted information, use of information can be limited properly.

According to the encryption method and the decoding method of the present invention, since encryption keys are hierarchized by using the one-way function, the decoding side which retains the latest encryption key can decode information encrypted by the previous encryption key. Therefore, the generation (hierarchy) of encryption keys can be managed with ease when the encryption key is updated.

Further, according to the encryption apparatus and the decoding apparatus of the present invention, since encryption keys are calculated from the master key memorized in the first memory by using the one-way function and the decoding means decodes information based on the encryption key memorized in the second memory, the decoding side which holds the master key can decode information encrypted by the encryption key computed from the master key. Therefore, the generation (hierarchy) of encryption keys can be managed with ease when the encryption key is updated. Furthermore, since the above-mentioned respective means are disposed within the single chip, the leakage of encryption keys to the outside can be suppressed, thereby making it possible to make security highly reliable.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method of encrypting predetermined information by using a predetermined encryption key comprising the steps of:

hierarchizing the encryption of said encryption key by sequentially encrypting a version of an encryption key from an immediate previously encrypted version of an encryption key by using a one way function, and decoding said predetermined information by using said hierarchized encryption of said encryption key wherein only a subsequent version excluding a first master version of an encryption key is able to decode the predetermined information of a previous version of an encryption key.

2. A method as claimed in claim 1, in which a first hierarchized encryption key of said hierachized encryption keys is a master key.

3. A method as claimed in claim 1, in which specific information is encrypted by using said hierarchized encryption key.

4. A method of recording predetermined encrypted information on a recording medium comprising the steps of:

receiving predetermined information encrypted by using an encryption key hierarchized by sequentially encrypting a version of an encryption key from an immediate previously encrypted version of an encryption key by a one way function; and recording said encrypted predetermined information on said recording medium whereby, only a subsequent version excluding a first master version of an encryption key is able to decode the predetermined information of a previous version of an encryption key.

5. A method according to claim 4, further comprising the steps of receiving specific information encrypted by using said encryption key and recording said encrypted specific information on said recording medium together with said encrypted predetermined information.

6. A method of decoding encrypted predetermined information comprising the steps of:

receiving encrypted predetermined information; and decoding said encrypted predetermined information by using a decoding key corresponding to an encryption key hierarchized by sequentially encrypting a version of an encryption key from an immediate previously encrypted version of an encryption key by using a one-way function whereby, only a subsequent version excluding a first master version of an encryption key is able to decode the predetermined information of a previous version of an encryption key.

7. A method as claimed in claim 6, in which a first hierarchized encryption key of said hierarchized encryption keys is a master key and a decoding key corresponding to an encryption key is generated from said master key by using said one-way function.

8. A method according to claim 6, further comprising the steps of receiving encrypted specific information, determining a decoding key corresponding to an encryption key, which encrypts said received encrypted predetermined information from specific information, encrypted specific information and information used to determine a decoding key corresponding to an encryption key, and decoding said encrypted predetermined information by using a determined decoding key.

9. A method as claimed in claim 8, in which said information for determining said decoding key corresponding to an encryption key is information of encryption of a master key or information of encryption of a latest encryption key.

10. A method as claimed in claim 8, in which said step for determining said decoding key corresponding to said encryption key comprises the steps of:

(a) decoding said encrypted predetermined information by using said information for determining a decoding key corresponding to an encryption key; and (b) comparing decoded specific information and said specific information and determining a decoding key corresponding to an encryption key based on a compared result.

11. A method as claimed in claim 10, in which if it is determined that said decoded specific information and said specific information agree with each other, then present information for determining a decoding key corresponding to an encryption key is a decoding key for decoding encrypted predetermined information, and if it is determined that said decoded specific information and said specific information do not agree with each other, then present information for determining a decoding key corresponding to an encryption key is hierarchized by using a one-way function and a decoding key corresponding to an encryption key is determined by repeating said steps (a) and (b).

12. A method as claimed in claim 6, in which said encrypted predetermined information is recorded on a recording medium, said encrypted predetermined information is read out from said recording medium and supplied, and said encryption key is printed on said recording medium or a case for storing said recording medium in the form of characters, numerals, bar code or hologram corresponding to said encryption key.

13. A method as claimed in claim 6, in which said encryption key is inserted into a predetermined software for decoding encrypted predetermined information as a code corresponding to said encryption key.

14. A method as claimed in claim 6, in which said encryption key is supplied through a telephone line network or a network.

15. An apparatus for decoding predetermined information by using a predetermined encryption key comprising:

means for generating encryption keys by hierarchizing the encryption of encryption keys by sequentially encrypting a version of an encryption key from an immediate previously encrypted version of an encryption key by using a one-way function; and means for decoding said predetermined information by using said hierarchized encryption keys whereby, only a subsequent version excluding a first master version of an encryption key is able to decode the predetermined information of a previous version of an encryption key.

16. An apparatus as claimed in claim 15, in which a first hierarchized encryption key of said hierarchized encryption keys is a master key.

17. An apparatus according to claim 15, further comprising means for encrypting specific information by using said hierarchized encryption keys.

18. An apparatus for decoding encrypted predetermined information comprising:

means for receiving said encrypted predetermined information; and means for decoding said encrypted predetermined information by using a decoding key corresponding to encryption keys hierarchized by sequentially encrypting a version of an encryption key from an immediate previously encrypted version of an encryption key by using a one way function whereby, only a subsequent version excluding a first master version of an encryption key is able to decode the predetermined information of a previous version of an encryption key.

19. An apparatus according to claim 18, further comprising a first memory for storing information used to determine a decoding key corresponding to said encryption key, means for generating a decoding key corresponding to an encryption key from said master key by using a one-way function and a second memory for storing a decoding key corresponding to said generated encryption key and wherein information for determining a decoding key corresponding to said encryption key is a master key which is a first hierarchized encryption key of said hierarchized keys.

20. An apparatus according to claim 18, further comprising means for receiving encrypted specific information and wherein said generating means determines a decoding key corresponding to an encryption key which encrypts said received encrypted predetermined information from specific information, encrypted specific information and information for determining a decoding key corresponding to an encryption key and said decoding means decodes said encrypted predetermined information by using a determined decoding key.

21. An apparatus as claimed in claim 20, in which said information for determining a decoding key corresponding to an encryption key is information of encryption of a master key or information of encryption of a latest encryption key.

22. An apparatus as claimed in claim 21, in which said generating means decodes said encrypted predetermined information by using said information for determining a decoding key corresponding to an encryption key, compares decoded specific information and said specific information and determines a decoding key corresponding to an encryption key based on a compared result.

23. An apparatus as claimed in claim 22, in which if it is determined that said decoded specific information and said specific information agree with each other, then said generating means determines that present information for determining a decoding key corresponding to an encryption key is a decoding key for decoding encrypted predetermined information and stores said decoding key in said second memory and if it is determined that said decoded specific information and said specific information do not agree with each other, then said generating means hierarchizes present information for determining a decoding key corresponding to said encryption key by using a one-way function and determines a decoding key corresponding to an encryption key by using said information for determining a decoding key corresponding to an encryption key, compares decoded specific information and said specific information and determines a decoding key corresponding to an encryption key based on a compared result.

24. An apparatus as claimed in claim 19, in which said first memory, said second memory, said generating means and said decoding means are disposed within a single IC chip.

25. An apparatus as claimed in claim 24, in which said information for determining a decoding key corresponding to said encryption key is previously stored in said first memory.

26. A recording medium decodable by a decoding apparatus, in which said recording medium includes a recording signal decodable by said decoding apparatus and said recording signal contains predetermined information encrypted by encryption keys hierarchized by sequentially encrypting a version of an encryption key from an immediate previously encrypted version of an encryption key by using a one-way function whereby, only a subsequent version excluding a first master version of an encryption key is able to decode the predetermined information of a previous version of an encryption key.

27. A recording medium as claimed in claim 26, in which said recording signal further includes specific information encrypted by using said encryption key.

28. A recording medium as claimed in claim 26, in which said encryption key is printed on said recording medium in the form of characters, numerals, bar code or hologram corresponding to said encryption key.

29. A method as claimed in claim 1, wherein said one way function is carried out as an irreversible calculation by calculating a subsequent encryption key from a previous encryption key but not reverse calculating from said subsequent encryption key.

30. A method as claimed in claim 29, wherein said one way function is calculated using a block cipher based algorithm.

31. A method as claimed in claim 29, wherein said one way function is calculated using an arithmetic algorithm.

32. An apparatus according to claim 15, in which said one way function is defined as irreversibly calculating a subsequent encryption key from a previous encryption key but not reverse calculating from said subsequent encryption key.

33. An apparatus according to claim 32, wherein said one way function is calculated using a block cipher based algorithm.

34. An apparatus according to claim 32, wherein said one way function is calculated using an arithmetic algorithm.

35. An apparatus according to claim 18, in which said one way function is defined as irreversibly calculating a subsequent encryption key from a previous encryption key but not reverse calculating from said subsequent encryption key.

36. An apparatus according to claim 35, wherein said one way function is calculated using a block cipher based algorithm.

37. An apparatus according to claim 36, wherein said one way function is calculated using an arithmetic algorithm.

* * * * *